United States Patent
Tidke et al.

(10) Patent No.: US 11,126,363 B2
(45) Date of Patent: Sep. 21, 2021

(54) MIGRATION RESUMPTION USING JOURNALS

(71) Applicant: EMC IP Holding Company LLC, Hopkinton, MA (US)

(72) Inventors: Ashwin Tidke, Pune (IN); Venkatesh Doddamane Nagaraj, Bangalore (IN); Kurumurthy Gokam, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/520,501

(22) Filed: Jul. 24, 2019

(65) Prior Publication Data

US 2021/0026551 A1  Jan. 28, 2021

(51) Int. Cl.
*G06F 3/06* (2006.01)
*G06F 9/4401* (2018.01)

(52) U.S. Cl.
CPC ............ *G06F 3/0647* (2013.01); *G06F 3/067* (2013.01); *G06F 3/0644* (2013.01); *G06F 9/4401* (2013.01)

(58) Field of Classification Search
CPC ...... G06F 3/0644; G06F 3/0647; G06F 3/067; G06F 9/4401
See application file for complete search history.

(56) References Cited

U.S. PATENT DOCUMENTS

| | | | |
|---|---|---|---|
| 6,260,156 B1 * | 7/2001 | Garvin | ................ G06F 12/0246 360/48 |
| 6,687,746 B1 | 2/2004 | Shuster et al. | |
| 6,697,875 B1 | 2/2004 | Wilson | |
| 6,959,373 B2 * | 10/2005 | Testardi | ................ G06F 3/0601 711/152 |
| 7,454,437 B1 | 11/2008 | Lavallee et al. | |
| 7,546,354 B1 * | 6/2009 | Fan | ..................... G06F 11/2025 709/219 |
| 7,640,409 B1 * | 12/2009 | Stafford | ................ G06F 3/0647 711/162 |
| 7,707,151 B1 * | 4/2010 | Blumenau | ............. G06F 3/0617 709/232 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Eric T Oberly
(74) *Attorney, Agent, or Firm* — Ryan, Mason & Lewis, LLP

(57) ABSTRACT

An apparatus in one embodiment comprises a host device that is configured to communicate over a network with at least one storage system comprising a source logical storage volume and a target logical storage volume. Responsive to a reboot of the host device during a migration of a plurality of chunks of data from the source logical storage volume to the target logical storage volume, the host device is configured to determine, based at least in part on an entry of a copy migration journal, the entry corresponding to a given chunk of the plurality of chunks, that the migration of the given chunk was in progress prior to the reboot. Responsive to determining that the migration of the given chunk was in progress prior to the reboot, the host device is configured to resume the migration of the plurality of chunks from the given chunk.

20 Claims, 9 Drawing Sheets

(56) References Cited

U.S. PATENT DOCUMENTS

| | | | |
|---|---|---|---|
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,904,681 B1 | 3/2011 | Bappe et al. | |
| 7,925,872 B2 | 4/2011 | Lai et al. | |
| 8,601,220 B1 * | 12/2013 | Corbin | G06F 3/0617 711/111 |
| 9,400,611 B1 | 7/2016 | Raizen | |
| 9,594,780 B1 | 3/2017 | Esposito et al. | |
| 9,778,852 B1 | 10/2017 | Marshak et al. | |
| 10,353,714 B1 | 7/2019 | Gokam et al. | |
| 2004/0010563 A1 | 1/2004 | Forte et al. | |
| 2006/0224843 A1 * | 10/2006 | Rao | G06F 3/0607 711/161 |
| 2008/0043973 A1 | 2/2008 | Lai et al. | |
| 2009/0193206 A1 * | 7/2009 | Ishii | G06F 3/0629 711/162 |
| 2009/0228532 A1 * | 9/2009 | Anzai | G06F 16/119 |
| 2011/0197027 A1 | 8/2011 | Balasubramanian et al. | |
| 2015/0113224 A1 * | 4/2015 | Achilles | G06F 12/0891 711/135 |
| 2016/0117113 A1 | 4/2016 | Li et al. | |
| 2017/0262220 A1 * | 9/2017 | Takakura | G06F 3/0653 |
| 2017/0315875 A1 * | 11/2017 | Tirupati Nagaraj | G06F 16/2272 |
| 2020/0081829 A1 * | 3/2020 | Bradshaw | G06F 3/0616 |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828 filed in the name of Sanjib Mallick et al. on Dec. 21, 2017 and entitled "Storage System with Input-Output Performance Control Utilizing Application Process Detection."

* cited by examiner

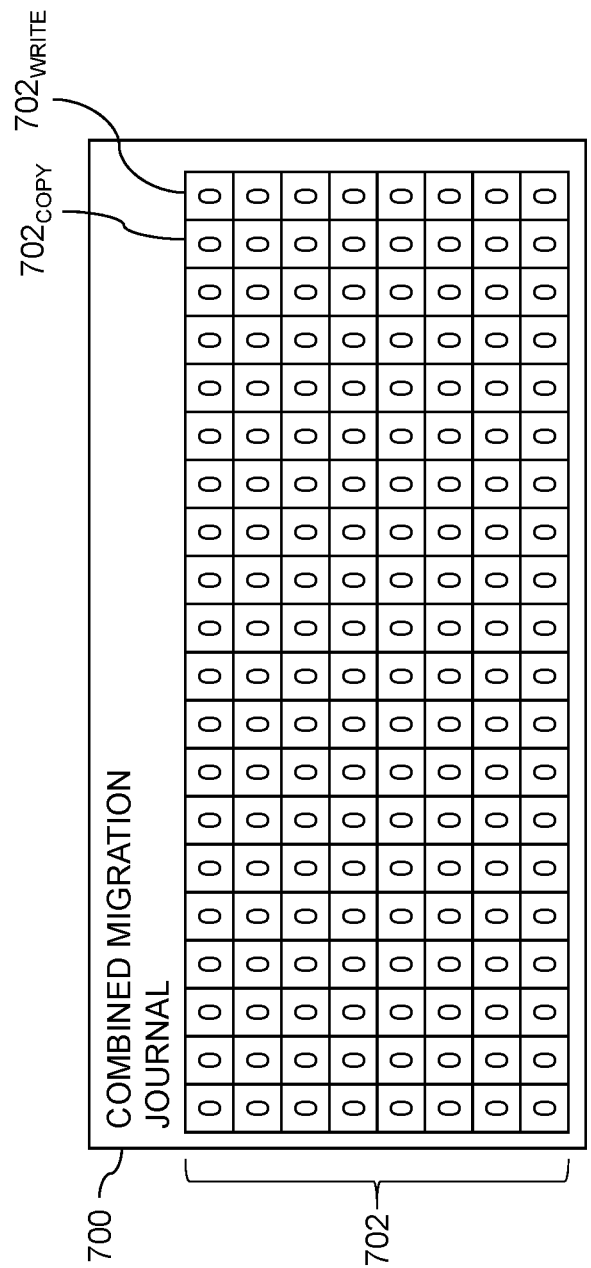

MIGRATION RESUMPTION USING JOURNALS

FIELD

The field relates generally to information processing systems, and more particularly to data migration in information processing systems.

BACKGROUND

Storage arrays and other types of storage systems are often shared by multiple host devices over a network. A host device may comprise a multipath input-output (MPIO) driver that is configured to process input-output (IO) operations for delivery from the host device to the storage system. Data migration techniques are used to move or "migrate" data from one logical storage volume to another for any of a variety of purposes, such as upgrading storage hardware or information lifecycle management.

SUMMARY

In one embodiment, an apparatus comprises at least one host device comprising a processor coupled to memory. The host device is configured to communicate over a network with at least one storage system comprising a source logical storage volume and a target logical storage volume. Responsive to a reboot of the host device during a migration of a plurality of chunks of data from the source logical storage volume to the target logical storage volume, the host device is configured to determine, based at least in part on an entry of a copy migration journal, the entry corresponding to a given chunk of the plurality of chunks, that the migration of the given chunk from the source logical storage volume to the target logical storage volume was in progress prior to the reboot. Responsive to determining that the migration of the given chunk was in progress prior to the reboot, the host device is configured to resume the migration of the plurality of chunks from the given chunk.

In some embodiments, the host device is configured, responsive to a completion of the migration of the given chunk from the source logical storage volume to the target logical storage volume, to select a next chunk of the plurality of chunks to be migrated from the source logical storage volume to the target logical storage volume. The host device is further configured to set an entry in the copy migration journal corresponding to the next chunk to indicate that the migration of the next chunk is in progress and to clear the entry in the copy migration journal corresponding to the given chunk to indicate that the migration of the given chunk is no longer in progress. The host device is further configured to initiate migration of the next chunk from the source logical storage volume to the target logical storage volume.

In an embodiment, the host device is further configured to obtain a write input-output operation targeting the source logical storage volume during the migration of the plurality of chunks of data from the source logical storage volume to the target logical storage volume and to identify a chunk of the plurality of chunks that contains data targeted by the write input-output operation. The host device is further configured to determine whether or not an entry in a write migration journal corresponding to the identified chunk indicates that an operation associated with the identified chunk is in progress and responsive to the entry in the write migration journal corresponding to the identified chunk indicating that an operation associated with the identified chunk is not in progress, to set the entry in the write migration journal corresponding to the identified chunk to indicate that an operation associated with the identified chunk is in progress. Responsive to the entry in the write migration journal indicating that an operation associated with the identified chunk is in progress, the host device is further configured to process the write input-output operation for both the source logical storage volume and the target logical storage volume. The host device is further configured to clear the entry in the write migration journal corresponding to the identified chunk to indicate that the operation associated with the identified chunk is not in progress based at least in part on a completion of the processing of the write input-output operation for both the source logical storage volume and the target logical storage volume.

In another embodiment, responsive to the reboot of the host device during the migration of the plurality of chunks of data from the source logical storage volume to the target logical storage volume, the host device is further configured to determine that an entry in the write migration journal corresponding to a second given chunk indicates that a second operation associated with the second given chunk was in progress prior to the reboot. Further responsive to the entry in the write migration journal corresponding to the second given chunk indicating that the second operation associated with the second given chunk was in progress prior to the reboot, the host device is configured to temporarily suspend the migration of the plurality of chunks from the source logical storage volume to the target logical storage volume and to process the second operation associated with the second given chunk that was in progress prior to the reboot while the migration is suspended. The host device is further configured to clear the entry in the write migration journal corresponding to the second given chunk to indicate that the second operation associated with the second given chunk is not in progress based at least in part on a completion of the processing of the second operation and to resume the migration of the plurality of chunks from the source logical storage volume to the target logical storage volume based at least in part on the clearing of the entry in the write migration journal corresponding to the second given chunk to indicate that the second operation associated with the second given chunk is not in progress.

These and other illustrative embodiments include, without limitation, apparatus, systems, methods and computer program products comprising processor-readable storage media.

BRIEF DESCRIPTION OF THE DRAWINGS

FIG. 7 is a diagram illustrating an example combined migration journal in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
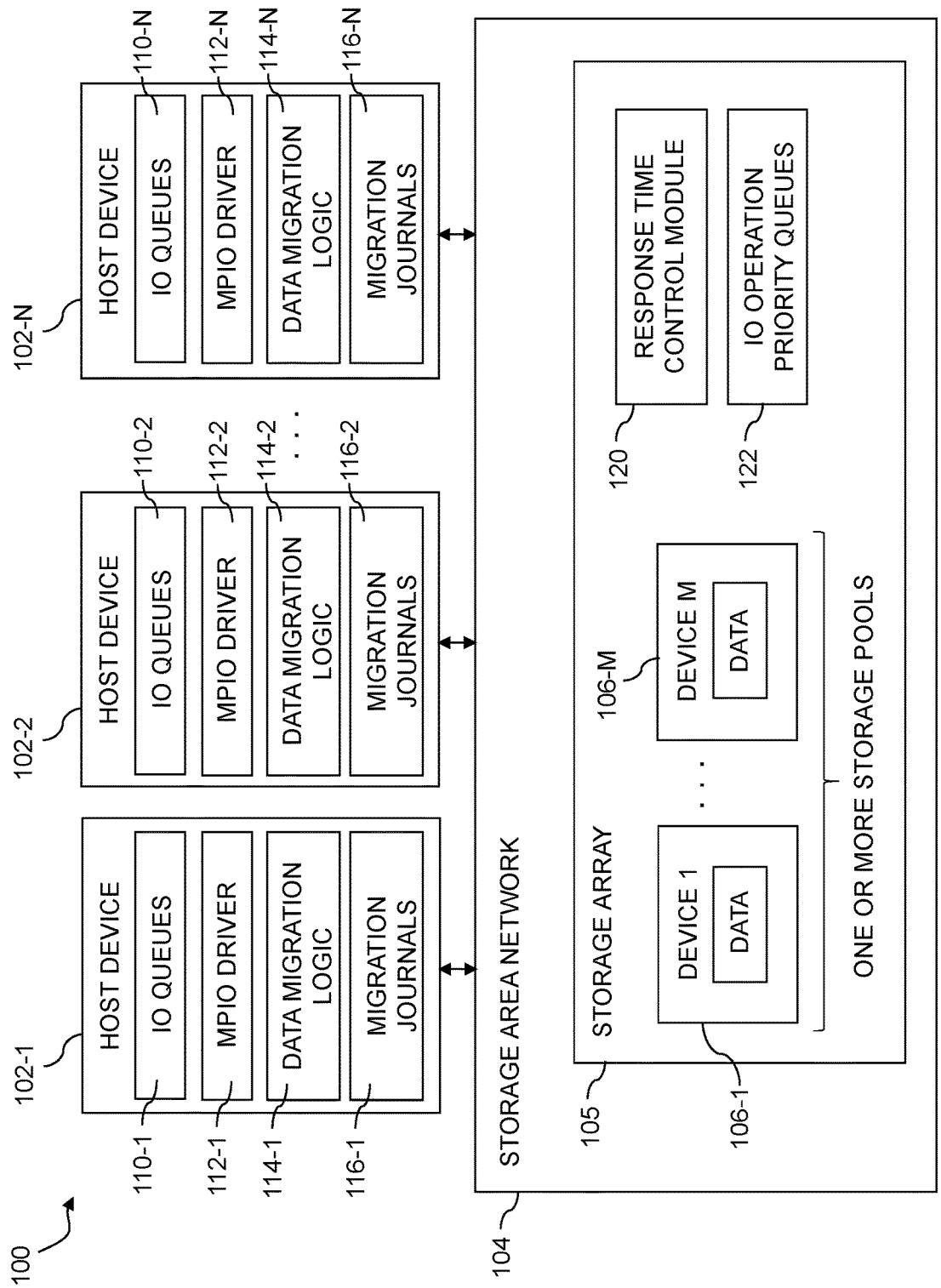
FIG. 1 is a block diagram of an information processing system configured with functionality for migration resumption using journals in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102 and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical units (LUNs) configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation, as that term is broadly used herein, illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and 10 operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017, and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to support migration resumption using journals as disclosed herein.

For example, the storage array 105 may comprise one or more storage arrays such as VNX®, Symmetrix VIVIAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

The host devices 102 comprise respective sets of IO queues 110-1, 110-2, . . . 110-N, respective MPIO drivers 112-1, 112-2, . . . 112-N and respective data migration logic 114-1, 114-2, . . . 114-N, which may generally be referred to herein as data migration logic 114. The MPIO drivers 112 collectively comprise a multipath layer of the host devices 102. In illustrative embodiments, the data migration logic 114 of a given host device 102 is implemented as a separate component of the given host device 102 from the MPIO driver 112. In some embodiments, the data migration logic 114 may alternatively be partially or fully implemented as part of the MPIO drivers 112. The host devices 102 also store migration journals 116-1, 116-2 . . . 116-N. In some embodiments, the migration journals 116 are stored in association with or as part of their corresponding MPIO drivers 112.

MPIO drivers typically group all paths from a host device to a LUN into a single logical device known as a multipath logical device. The individual block devices representing each path are known as native devices. Applications use a multipath logical device for IO operations so that the IO operations may be distributed across all available paths. When paths fail, the MPIO driver will typically redirect the IO operations to other alive paths in the multipath logical device.

The MPIO drivers described herein may comprise, for example, otherwise conventional MPIO drivers, such as PowerPath® drivers from Dell EMC of Hopkinton, Mass., suitably modified in the manner disclosed herein to implement functionality for migration resumption using journals. Other types of MPIO drivers from other driver vendors may be suitably modified to incorporate functionality for migration resumption using journals as disclosed herein.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers of the multipath layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

In some embodiments, migration involves synchronizing a target logical storage volume to a source logical storage volume, i.e., achieving an operating state in which the target logical storage volume stores the same data as the source logical storage volume, and then a path flip operation is performed so that subsequent accesses of the data are directed to the target logical storage volume instead of the source logical storage volume. Once the path flip operation is successfully accomplished, the source logical storage volume can be taken out of service or put to some other use. In some embodiments the target logical storage volume and the source logical storage volume may be part of the same storage system. In some embodiments, the target logical storage volume and the source logical storage volume may each be part of different storage systems.

A number of data migration technologies are available to migrate data from a source logical storage volume to a target logical storage volume. One such data migration tool is Dell EMC PowerPath® Migration Enabler (PPME). PowerPath®, of which PPME is one component, is available on common operating systems such as Linux, Windows, AIX and VMware ESX. PPME uses multiple data transfer technologies for data migration including, for example, Host Copy, Write Cloning, Open Replicator, Sym clone, SAN copy or other similar technologies.

Copy sweep techniques may be utilized for bulk data migration. Copy sweep techniques typically copy the existing data blocks of the source logical storage volume to the target logical storage volume sequentially in chunks of blocks.

Write cloning techniques may be utilized for ensuring consistency between the source and target logical storage volumes for any data blocks that are targeted by pending write IO operations. Write cloning techniques typically duplicate ongoing application write IO operations from the source logical storage volume to the target logical storage volume before acknowledging success of the write IO operations to the application. This guarantees that the source and target logical storage volumes are always consistent with each other. Write cloning operations are often given a higher priority than copy sweep operations.

Example copy sweep and write cloning techniques may be found in U.S. Pat. No. 7,770,053, entitled "Systems and methods for maintaining data integrity during a migration," the entirety of which is incorporated herein by reference.

A migration of data from a source logical storage volume to a target logical storage volume typically includes the monitoring and replication of on-going application write input-output (TO) operations to maintain consistency between the source and target logical storage volumes. If a host reboots during a migration, for example, due to a crash, migration software is often unable to determine whether or not a write IO operation has been replicated on both logical storage volumes. To guarantee target consistency, the migration is often re-started from the beginning in response to a host reboot thus wasting time and CPU cycles which can be substantial for large amounts of data. For example, where logical storage volumes comprise terabytes of data, a migration may take hours or even days to complete, utilizing significant processing resources and bandwidth of the system. When a reboot occurs, for example due to a crash, and the migration is re-started, processing and bandwidth usage will need to be repeated. In a case where the reboot occurs toward the end of the migration, this may result in significant additional strain on the information processing system which may impact or otherwise disrupt the array onboarding schedules of applications running on the host devices.

In illustrative embodiments, migration journals 116 are utilized to track and identify the data blocks that need to be brought into consistency between the source and target logical storage volumes after the host reboots. Once the source logical storage volume and target logical storage volume are in a consistent state, the migration can continue as usual from the next chunk of data blocks.

Figure 5:
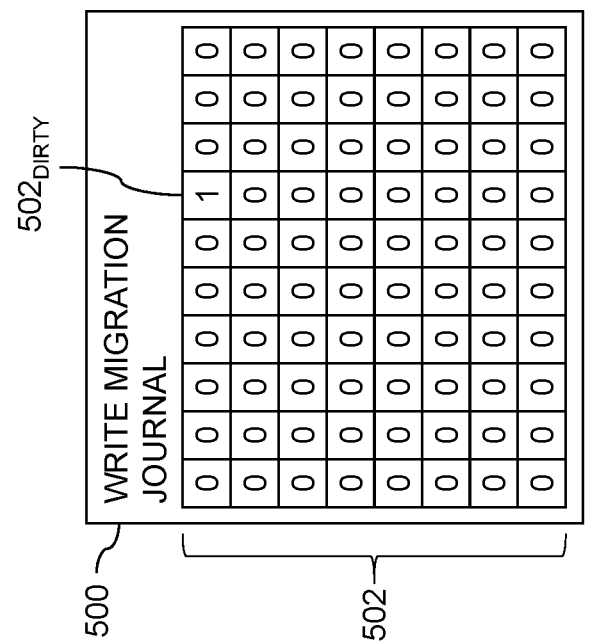
FIG. 5 is a diagram illustrating an example write migration journal in an illustrative embodiment.

Migration journals 116 may be utilized to keep track of any active operations being performed during a migration of data from a source logical storage volume to a target logical storage volume. In some embodiments, the migration journals 116 associated with each host device 102 may comprise a copy migration journal 200 (FIG. 2) and a write migration journal 500 (FIG. 5). For example, the copy migration journal 200 may be utilized to keep track of any copy operations to copy chunks of data blocks from the source logical storage volume to the target logical storage volume as part of the migration and the write migration journal 500 may be utilized to keep track of any application write IO operations that have been issued to the source logical storage volume during the migration but have not yet been replicated on both the source logical storage volume and the target logical storage volume. In some embodiments, the copy migration journal 200 and write migration journal 500 may be combined into a single combined migration journal 700 (FIG. 7) that may be utilized to keep track of both the operations to copy chunks of data blocks and the application write IO operations.

In one example, the migration journals 116, such as, e.g., copy migration journal 200 (FIG. 2) and write migration journal 500 (FIG. 5), may each comprise a persistent bitmap with each bit in the bitmap corresponding to a chunk of the data blocks being migrated from the source logical storage volume to the target logical storage volume. In an embodiment where the copy migration journal 200 (FIG. 2) and write migration journal 500 (FIG. 5) are combined into a single combined migration journal 700 (FIG. 7), a pair of bits in the bitmap, e.g., $702_{COPY}$ and $702_{WRITE}$ as shown in FIG. 7, may correspond to each chunk where, for example, one of the bits, e.g., $702_{COPY}$ for a given chunk, corresponds to the copy migration journal and one of the bits, e.g., $702_{WRITE}$ for the given chunk, corresponds to the write migration journal for each chunk. In other embodiments, other journaling mechanisms may be utilized including, e.g., arrays, linked-lists, tables, or any other journaling mechanism. In some embodiments, the migration journals 116 may be supplemental journals specific to a data migration and separate from a main journal that tracks incoming IO operations in the information processing system 100.

Figure 2:
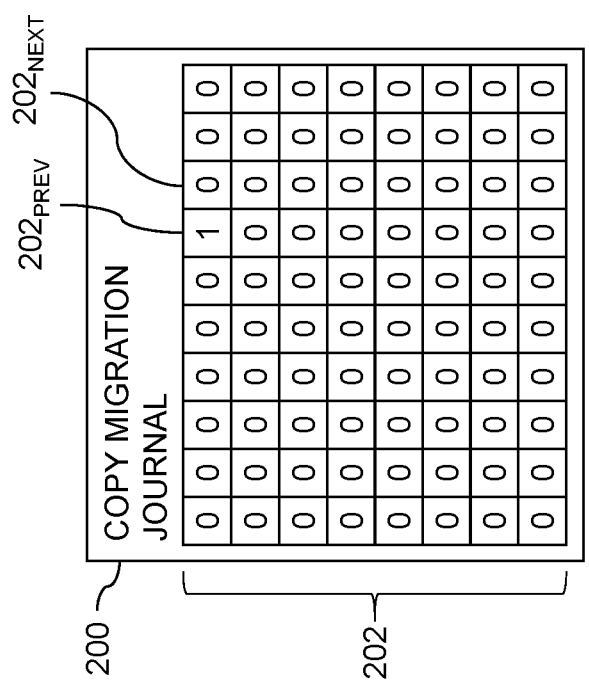
FIG. 2 is a diagram illustrating an example copy migration journal in an illustrative embodiment.
Figure 3:
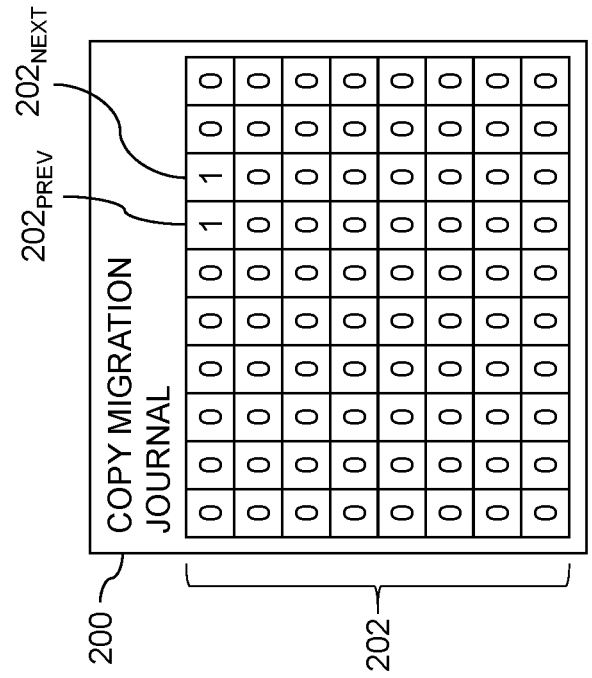
FIG. 3 is a diagram illustrating the example copy migration journal of FIG. 2 with an entry for the next chunk set in an illustrative embodiment.
Figure 4:
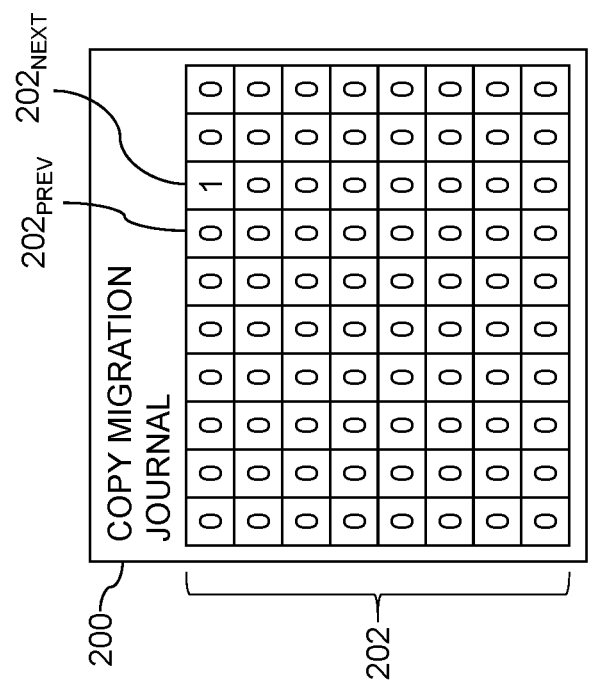
FIG. 4 is a diagram illustrating the example copy migration journal of FIG. 3 with the entry for the previous chunk cleared in an illustrative embodiment.

With reference to FIGS. 2-4, an example copy migration journal 200 is illustrated. Copy migration journal 200 comprises a plurality of entries 202. In the embodiment where copy migration journal 200 comprises a bitmap, the entries 202 of copy migration journal 200 may each comprise a single bit that may have a value of either a 0 or a 1. For example, as seen in FIG. 2, the entry $202_{PREV}$ has a value of 1 to indicate that a migration of the chunk of data blocks corresponding to the entry $202_{PREV}$ is in progress while the entry $202_{NEXT}$ has a value of 0 to indicate that a migration of the chunk of data blocks corresponding to the entry $202_{NEXT}$ is not in progress. While the bits of the entries 202 of copy migration journal 200 are described as having values of 1 and 0, any other values may be used to indicate whether a migration of the chunk of data blocks corresponding to an entry 202 is in progress or not in progress. During migration, each entry 202 may be set, e.g., changing the value of the bit to 1, or cleared, e.g., changing the value of the bit to 0, to indicate whether a migration is in progress for the corresponding chunk. While setting or clearing an entry 202 are described herein as changing the value of a bit to 1 or 0 respectively, in alternative embodiments, setting or clearing an entry 202 may alternatively correspond to changing a value associated with the entry to any other values.

Figure 6:
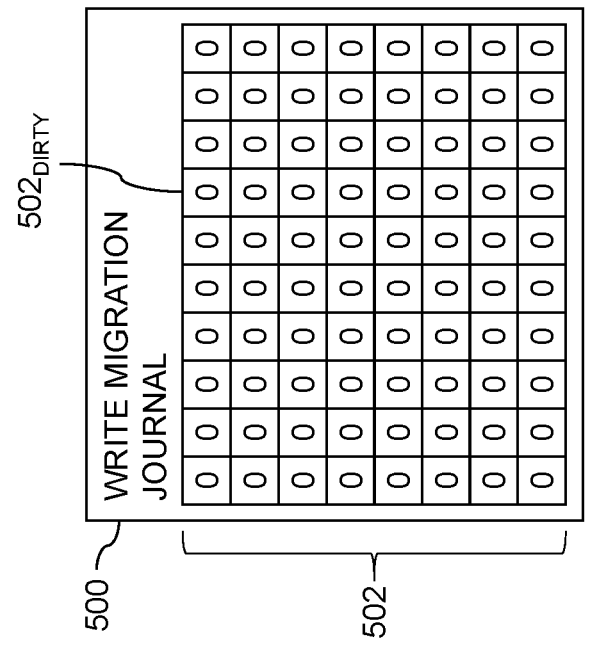
FIG. 6 is a diagram illustrating the example write migration journal of FIG. 5 with the entry for a dirty chunk cleared in an illustrative embodiment.

With reference to FIGS. 5 and 6, an example write migration journal 500 is illustrated. Write migration journal 500 comprises a plurality of entries 502. In the embodiment where write migration journal 500 comprises a bitmap, the entries 502 of write migration journal 500 may each comprise a single bit that may have a value of either a 0 or a 1. For example, as seen in FIG. 5, the entry $502_{DIRTY}$ has a value of 1 to indicate that a write IO operation is pending for the chunk of data blocks corresponding to the entry $502_{DIRTY}$ while as seen in FIG. 6, the entry $502_{DIRTY}$ has a value of 0 to indicate that no write IO operations are pending for the chunk of data blocks corresponding to the entry $502_{DIRTY}$. While the bits of the entries 502 of write migration journal 500 are described as having values of 1 and 0, any other values may be used to indicate whether a write IO operation is pending for the chunk of data blocks corresponding to an entry 502 is in progress or not in progress. During migration, each entry 502 may be set, e.g., changing the value of the bit to 1, or cleared, e.g., changing the value of the bit to 0, to indicate whether a write IO operation is pending for the chunk of data blocks corresponding to the entry. While setting or clearing an entry 502 are described herein as changing the value of a bit to 1 or 0 respectively, in alternative embodiments, setting or clearing an entry 502 may alternatively correspond to changing a value associated with the entry to any other values.

With reference to FIG. 7, an example combined migration journal 700 is illustrated. Combined migration journal 700 comprises a plurality of entries 702. In the embodiment where combined migration journal 700 comprises a bitmap, the entries 702 of combined migration journal 700 may each comprise a single bit that have a value of either a 0 or a 1. In this embodiment, each chunk may correspond to a pair of entries. For example, as seen in FIG. 7, the entry $702_{COPY}$ and the entry $702_{WRITE}$ correspond to the same chunk. During migration, entry $702_{COPY}$ is set and cleared in a similar manner to the entries 202 of copy migration journal 200 while entry 702 WRITE is set and cleared in a similar manner to the entries 502 of write migration journal 500. The functionality of data migration logic 114 with respect to copy migration journal 200 and write migration journal 500 will be described in more detail below. While described with respect to the copy migration journal 200 and write migration journal 500, the below functionality is also applicable to the combined migration journal 700.

Illustrative embodiments of the techniques and functionality of data migration logic 114 during a migration of data blocks from the source logical storage volume to the target logical storage volume will now be described in more detail with reference to the flow diagram of FIG. 8.

Figure 8:
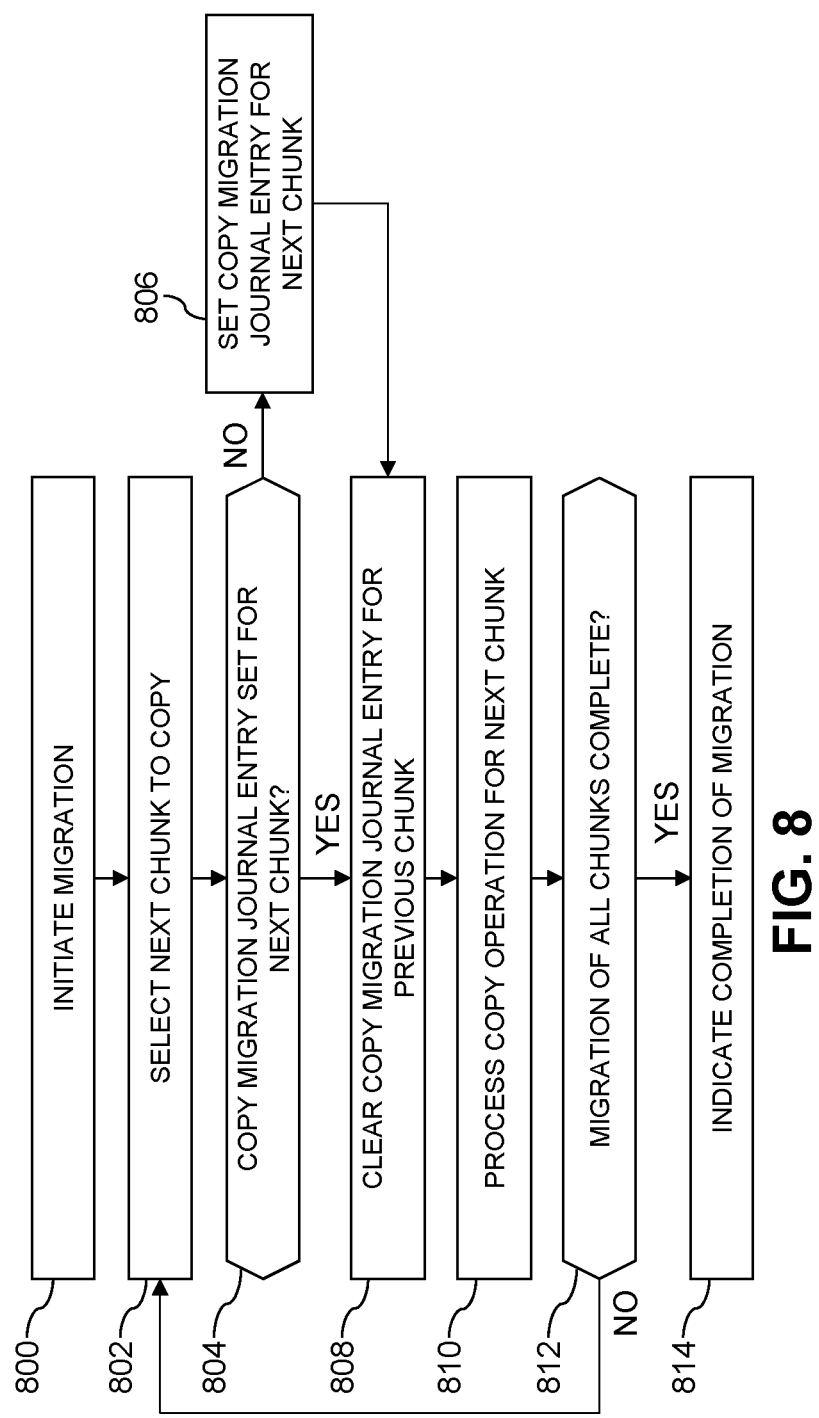
FIG. 8 is a flow diagram of an example bulk copy process in an illustrative embodiment.

The process as shown in FIG. 8 includes steps 800 through 814 and is suitable for use in the system 100 but is more generally applicable to other types of systems comprising multiple host devices and a shared storage system. The process will be described with reference also to FIGS. 2-4.

At 800, data migration logic 114 initiates a migration of data blocks from a source logical storage volume to a target logical storage volume. For example, a copy sweep operation may be executed by data migration logic 114 to sequentially copy chunks of data blocks from the source logical storage volume to the target logical storage volume.

At 802, data migration logic 114 selects the next chunk to copy. For example, if one or more chunks have already been copied, data migration logic 114 selects the next chunk in sequential order. If no chunks have yet been copied, data migration logic 114 selects the first chunk. In the example of FIG. 2, the chunk corresponding to entry $202_{NEXT}$ in the copy migration journal 200 may be selected as the next chunk.

At 804, data migration logic 114 determines whether the entry in the copy migration journal 200 corresponding to the selected next chunk is set, for example, to a value of 1 or any other value. If the entry corresponding to the selected next chunk is not set, for example, as shown by the value of 0 in entry $202_{NEXT}$ in the example of FIG. 2, the process proceeds to step 806 and data migration logic 114 sets the entry in the copy migration journal 200 corresponding to the selected next chunk, e.g., entry $202_{NEXT}$ in the example of FIG. 2. For example, the entry may be set to 1 to indicate that a migration of the next chunk is in progress, as shown by the value of 1 in entry $202_{NEXT}$ in the example of FIG. 3. The process then proceeds to step 808. Returning to step 804, if the entry corresponding to the selected next chunk is already set, for example, as shown by the value of 1 in entry $202_{NEXT}$ in the example of FIG. 3, the process also proceeds to step 808.

At 808, data migration logic 114 clears the entry in the copy migration journal 200 corresponding to the previous chunk, for example, entry $202_{PREV}$ as shown in the example of FIG. 4.

At 810, a copy operation for the next chunk is processed to copy the data blocks of the next chunk from the source logical storage volume to the target logical storage volume.

At 812, data migration logic 114 determines whether or not the migration of all chunks that are being migrated from the source logical storage device to the target logical storage device has been completed. If the migration has not been completed, the process returns to step 802. If the migration has been completed, the process proceeds to step 814 and an indication of a completion of the migration is provided to the application.

Separate instances of the FIG. 8 process may be performed in respective additional host devices that share the storage array.

Illustrative embodiments of the techniques and functionality of data migration logic 114 in response to a reboot that has occurred during the migration of data blocks from the source logical storage volume to the target logical storage volume will now be described in more detail with reference to the flow diagram of FIG. 9. The reboot may occur in response to a crash or another issue that causes a host device 102 or another portion of information processing system 100 to reboot or may alternatively occur as part of a planned reboot.

Figure 9:
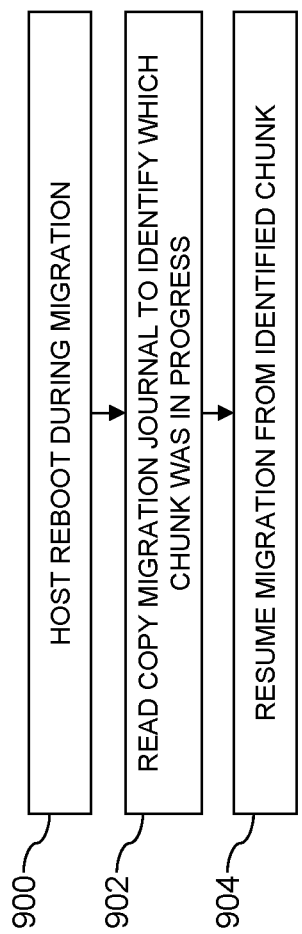
FIG. 9 is a flow diagram of an example process for migration resumption using journals in response to a reboot during the example bulk copy process of FIG. 8 in an illustrative embodiment.

The process as shown in FIG. 9 includes steps 900 through 904 and is suitable for use in the system 100 but is more generally applicable to other types of systems comprising multiple host devices and a shared storage system. The process will be described with reference also to FIG. 4.

At 900, the host device 102 reboots during a migration of data blocks from the source logical storage volume to the target logical storage volume.

At 902, data migration logic 114 reads the copy migration journal 200 to determine which chunk of data blocks was in progress. For example, if the host device crashes and reboots during a data migration, the entry in the copy migration journal 200 that was set at the time of the crash will still be set when the host device 102 reboots. For example, data migration logic 114 may determine, based on the state of the copy migration journal 200 as shown in FIG. 4, that the entry $202_{NEXT}$ has a value of 1 which indicates that the chunk corresponding to entry $202_{NEXT}$ is the chunk that was in progress.

At 904, data migration logic 114 resumes the migration of the data blocks, for example, as part of a copy sweep operation, at the chunk corresponding to the entry $202_{NEXT}$. For example, data migration logic 114 may resume the migration by repeating the copy of the chunk corresponding to the entry $202_{NEXT}$ since data migration logic 114 is not able to confirm that the migration of the entire chunk corresponding to the entry $202_{NEXT}$ was completed prior to the reboot.

Separate instances of the FIG. 9 process may be performed in respective additional host devices that share the storage array.

Illustrative embodiments of the techniques and functionality of data migration logic 114 when a write IO operation is issued by an application during a migration of data blocks from the source logical storage volume to the target logical storage volume will now be described in more detail with reference to the flow diagram of FIG. 10.

Figure 10:
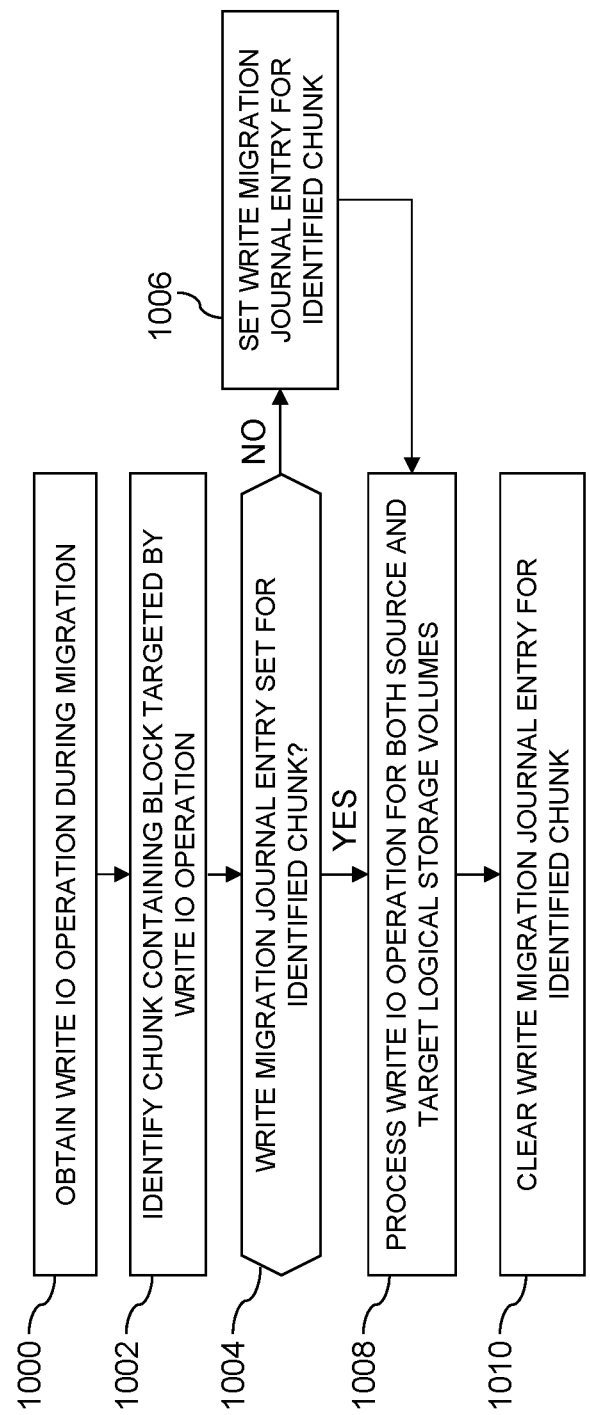
FIG. 10 is a flow diagram of an example write cloning process in an illustrative embodiment.

The process as shown in FIG. 10 includes steps 1000 through 1010 and is suitable for use in the system 100 but is more generally applicable to other types of systems comprising multiple host devices and a shared storage system. The process will be described with reference also to FIGS. 5 and 6.

At 1000, data migration logic 114 obtains a write IO operation issued by an application, for example, from the IO queues 110 of the host device 102.

At 1002, data migration logic 114 identifies a chunk containing a block targeted by the obtained write IO operation. In some embodiments, for example where the write IO operation targets blocks contained in multiple chunks, multiple chunks may be identified.

At 1004, data migration logic 114 determines whether or not the entry corresponding to the identified chunk in the write migration journal 500 is set. For example, with reference to FIG. 6, the entry $502_{DIRTY}$ is not set, e.g., has a value of 0, indicating that no write IO operations are currently pending for the corresponding chunk while as another example, with reference to FIG. 5, the entry $502_{DIRTY}$ is set, e.g., has a value of 1, which indicates that a write IO operation is pending for the corresponding chunk. If the entry corresponding to the identified chunk is not set, the process proceeds to step 1006. If the entry corresponding to the identified chunk is already set, the process proceeds to step 1008.

At 1006, data migration logic 114 sets the entry in the write migration journal 500 corresponding to the identified chunk. For example, data migration logic 114 may set the value of entry $502_{DIRTY}$ to 1, as shown in FIG. 5. The process then proceeds to step 1008.

At 1008, data migration logic 114 processes the write IO operation for both the source logical storage volume and target logical storage volume.

At 1010, once all write IO operations targeting the identified chunk have completed, data migration logic 114 clears the entry in the write migration journal 200 corresponding to the identified chunk. For example, data migration logic 114 may clear the entry $502_{DIRTY}$, e.g., set the value to 0, to indicate that the corresponding chunk no longer has a pending write IO operation, as shown in FIG. 6.

Separate instances of the FIG. 10 process may be performed in respective additional host devices that share the storage array.

Illustrative embodiments of the techniques and functionality of data migration logic 114 in response to a reboot that has occurred during the migration of data blocks from the source logical storage volume to the target logical storage volume while a write IO operation is pending will now be described in more detail with reference to the flow diagram of FIG. 11.

Figure 11:
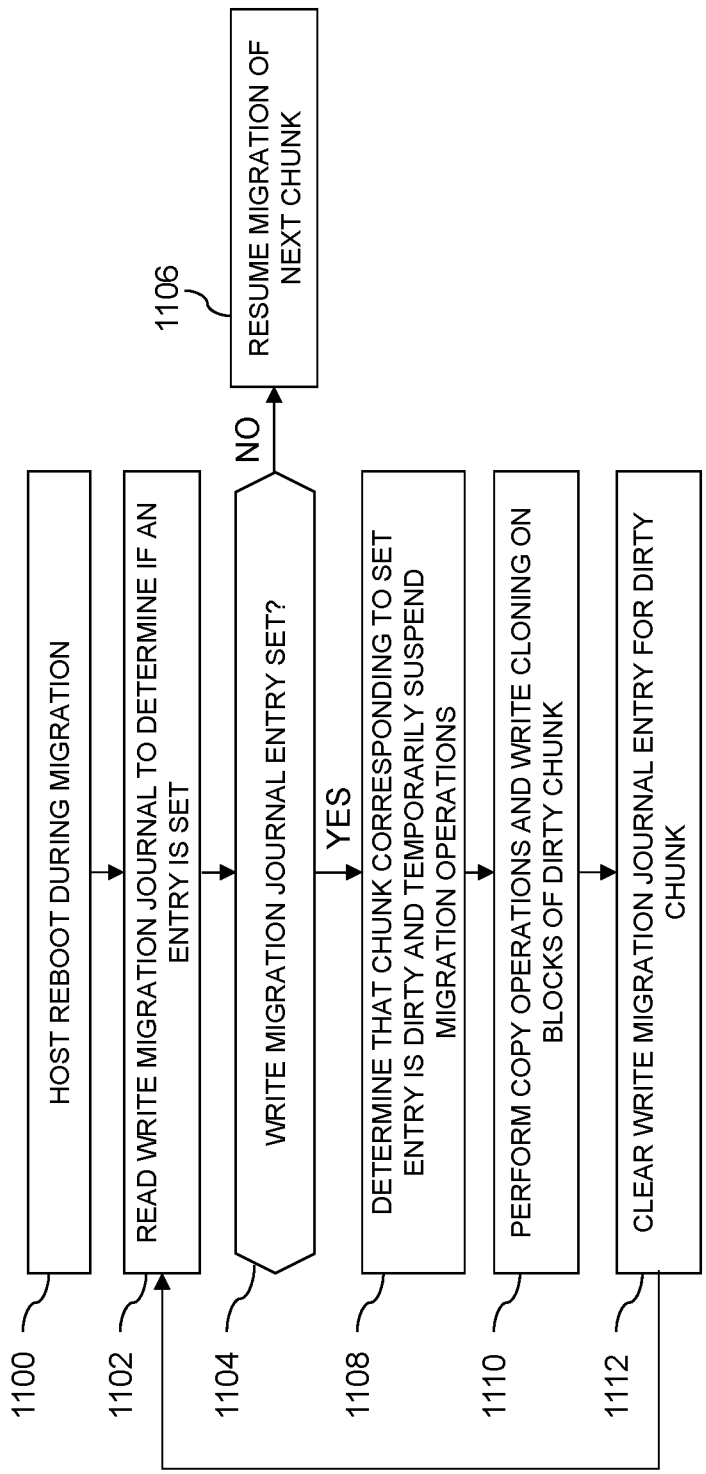
FIG. 11 is a flow diagram of an example process for migration resumption using journals in response to a reboot during the write cloning process of FIG. 10 in an illustrative embodiment.

The process as shown in FIG. 11 includes steps 1100 through 1014 and is suitable for use in the system 100 but is more generally applicable to other types of systems comprising multiple host devices and a shared storage system. The process will be described with reference also to FIGS. 5 and 6.

At 1100, the host device 102 reboots during a migration of data blocks from the source logical storage volume to the target logical storage volume while a write IO operation is pending. When the host reboots, a list of migrations is identified. For example, in some embodiments the host device may store a list of all migrations that are occurring including which pairs of logical storage volumes are participating in each migration. As part of the reboot, the write migration journals 500 corresponding to any migration in the list is read into memory.

At 1102, data migration logic 114 reads the write migration journal 500.

At 1104, data migration logic 114 determines whether or not an entry in the write migration journal 500 is set. For example, if the host device crashes and reboots during a data migration while a write IO operation is pending, an entry in the write migration journal 500 that was set at the time of the crash will still be set when the host device 102 reboots. For example, data migration logic 114 may determine, based on the state of the write migration journal 500 as shown in FIG. 5, that the entry $502_{DIRTY}$ has a value of 1 which indicates that a write IO operation was pending for the chunk corresponding to entry $502_{DIRTY}$ prior to the reboot. If no entries in the write migration journal 500 are set, e.g., as shown in FIG. 6, the process proceeds to step 1106 and the migration resumes from the next chunk as described above with reference to the process of FIG. 9. If an entry is set in the write migration journal 500, e.g., as shown in FIG. 5, the process proceeds to step 1108.

At 1108, data migration logic 114 determines that the chunk corresponding to the set entry in the write migration journal 500 is dirty and suspends the migration operations. For example, with reference to FIG. 5, data migration logic 114 may determine that the chunk corresponding to the entry $502_{DIRTY}$ is dirty and may suspend the bulk copying of data, e.g., using the copy sweep technique, from the source logical storage volume to the target logical storage volume. While the migration is suspended, an application may still be able to submit write and read IO operations on the dirty blocks since the source logical storage volume will still service incoming IO operations. The above described copy sweep techniques ensure that the application write IO operations are given higher precedence over bulk copy operations and the above described write cloning techniques ensure that write IO operations are cloned onto both the source and target logical storage volumes.

At 1110, data migration logic 114 performs copy operations and write cloning operations on the data blocks of the dirty chunk. For example, because the data migration logic 114 does not know whether or not the write IO operation was successful prior to the reboot, the write IO operation needs to be re-processed and the entire chunk needs to be re-copied from the source logical storage device to the target logical storage device. This may be performed using the write cloning and copy sweet techniques described above.

At 1112, after the copy operations and write cloning operations on the data blocks of the dirty chunk are complete, data migration logic 114 clears the entry corresponding to the dirty chunk in the write migration journal 500. For example, as shown in the example of FIG. 6, the entry $502_{DIRTY}$ is cleared, e.g., set to 0, to indicate that the copy operations and write cloning operations for the dirty chunk have been completed. The process then returns to step 1102 and data migration logic 114 determines whether or not any other entries in the write migration journal 500 are set. Separate instances of the FIG. 11 process may be performed in respective additional host devices that share the storage array.

The particular processing operations and other system functionality described in conjunction with the flow diagrams of FIGS. 8-11 are presented by way of illustrative example only, and should not be construed as limiting the scope of the disclosure in any way. Alternative embodiments can use other types of processing operations involving host devices, storage systems and data migration logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different data migration logic arrangements within a given information processing system.

Functionality such as that described in conjunction with the flow diagrams of FIGS. 8-11 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for migration resumption using journals are carried out at least in part under the control of its data migration logic 114. For example, data migration logic 114 is illustratively configured to control performance of portions of the processes shown in the flow diagrams described above in conjunction with FIGS. 8-11.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104, and to perform the disclosed functionality for migration resumption using journals. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support migration resumption using journals.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with non-volatile memory express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeOF.

As indicated previously, absent use of functionality for migration resumption using journals as disclosed herein, recovery of a migration after a reboot of the host device may require restarting a data migration from the beginning to ensure consistency, incurring significant additional processing bandwidth overhead. This leads to inefficiencies in the storage system as well as in the host device performing the data migration.

Such drawbacks are advantageously overcome in illustrative embodiments herein by utilization of data migration logic 114 to implement functionality for migration resumption using journals as described above. For example, the disclosed techniques provide application consistency while also decreasing the recovery time in case of a reboot, for example, due to a crash, using an additional journal write for each write IO operation. The disclosed techniques also allow the host device to perform a voluntary reboot operation during a data migration without significantly impacting the data migration or wasting significant processing or bandwidth resources restarting the data migration from the beginning. In some embodiments, the additional IO overhead may be reduced by choosing an appropriate size for the chunk being tracked by each entry. For example, a many to one ratio between blocks and entries may require only a single-entry update for multiple simultaneous write IO operations in the same chunk. As another example, the persistent bitmap may be maintained on a high-performance storage device, such as a battery-backed cache, NVRAM or a high-end storage array.

It is to be appreciated that these and other features of illustrative embodiments are presented by way of example only and should not be construed as limiting in any way. Accordingly, different numbers, types and arrangements of system components such as host devices 102, SAN 104, storage array 105, storage devices 106, sets of IO queues 110, MPIO drivers 112, data migration logic 114, migration journals 116, copy migration journal 200, write migration journal 500 and combined migration journal 700 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the data migration logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, data migration logic and additional or alternative components. Also, the particular configurations of system and device elements and associated processing operations illustratively shown in the drawings can be varied in other embodiments. For example, a wide variety of different MPIO driver configurations and associated data migration arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device comprising a processor coupled to memory;
the host device being configured:
to communicate over a network with at least one storage system comprising a source logical storage volume and a target logical storage volume;

to migrate a plurality of chunks of data from the source logical storage volume to the target logical storage volume;

to maintain a copy migration journal comprising a plurality of copy migration entries, each copy migration entry of the copy migration journal corresponding to a different chunk of the plurality of chunks and comprising an indication of whether or not a migration of the corresponding chunk is in progress, the copy migration journal being separate from the plurality of chunks of data that correspond to its copy migration entries;

to maintain a write migration journal comprising a plurality of write migration entries, each write migration entry of the write migration journal corresponding to a different chunk of the plurality of chunks and comprising an indication of whether or not a write operation associated with the corresponding chunk is in progress;

wherein responsive to a reboot of the host device during the migration of the plurality of chunks of data from the source logical storage volume to the target logical storage volume, the host device is further configured:

to determine, based at least in part on a given copy migration entry of the copy migration journal, the given copy migration entry corresponding to a first chunk of the plurality of chunks, that the migration of the first chunk from the source logical storage volume to the target logical storage volume was in progress prior to the reboot;

to determine, based at least in part on a given write migration entry of the write migration journal, the given write migration entry corresponding to a second chunk of the plurality of chunks, that a write operation associated with the second chunk was in progress prior to the reboot;

based at least in part on the determination that the write operation associated with the second chunk was in progress prior to the reboot, to temporarily suspend the migration of the plurality of chunks from the source logical storage volume to the target logical storage volume and to perform the write operation associated with the second chunk while the migration is suspended;

based at least in part on a completion of the write operation associated with the second chunk, to update the given write migration entry to indicate that a write operation associated with the second chunk is not in progress; and to resume the migration of the plurality of chunks from the first chunk based at least in part on the update of the given write migration entry to indicate that a write operation associated with the second chunk is not in progress and based at least in part on the determination that the migration of the first chunk was in progress prior to the reboot.

2. The apparatus of claim 1 wherein the reboot of the host device is performed in response to a crash of the host device and wherein the given copy migration entry of the copy migration journal corresponding to the first chunk indicates that the migration of the first chunk from the source logical storage volume to the target logical storage volume was in progress when the crash of the host device occurred.

3. The apparatus of claim 1 wherein the host device is further configured:

responsive to completion of the migration of the first chunk from the source logical storage volume to the target logical storage volume, to select a next chunk of the plurality of chunks to be migrated from the source logical storage volume to the target logical storage volume;

to set a copy migration entry in the copy migration journal corresponding to the next chunk to indicate that the migration of the next chunk is in progress;

to clear the given copy migration entry in the copy migration journal corresponding to the first chunk to indicate that the migration of the first chunk is no longer in progress; and to initiate migration of the next chunk from the source logical storage volume to the target logical storage volume.

4. The apparatus of claim 1 wherein the host device is further configured:

to obtain a second write operation targeting the source logical storage volume during the migration of the plurality of chunks of data from the source logical storage volume to the target logical storage volume;

to identify a chunk of the plurality of chunks that contains data targeted by the second write operation;

to determine whether or not a write migration entry in the write migration journal that corresponds to the identified chunk indicates that a write operation associated with the identified chunk is in progress;

responsive to the write migration entry in the write migration journal that corresponds to the identified chunk indicating that a write operation associated with the identified chunk is not in progress, to set the write migration entry in the write migration journal that corresponds to the identified chunk to indicate that a write operation associated with the identified chunk is in progress;

responsive to the write migration entry in the write migration journal that corresponds to the identified chunk indicating that a write operation associated with the identified chunk is in progress, to process the second write operation for both the source logical storage volume and the target logical storage volume; and to clear the write migration entry in the write migration journal that corresponds to the identified chunk to indicate that a write operation associated with the identified chunk is not in progress based at least in part on a completion of the processing of the second write operation for both the source logical storage volume and the target logical storage volume.

5. The apparatus of claim 4 wherein the copy migration journal comprises the write migration journal and wherein the second write operation associated with the identified chunk is at least one of a write operation targeting data of the identified chunk and a copy operation of the identified chunk from the source logical storage volume to the target logical storage volume.

6. The apparatus of claim 1 wherein the write migration journal and the copy migration journal are different journals.

7. The apparatus of claim 1 wherein the copy migration journal is a bitmap, each bit of the bitmap corresponding to one of the plurality of chunks.

8. A method comprising:

maintaining a copy migration journal comprising a plurality of copy migration entries, each copy migration entry of the copy migration journal corresponding to a different chunk of a plurality of chunks that are being migrated from a source logical storage volume of at least one storage system to a target logical storage volume of the at least one storage system, each copy migration entry of the copy migration journal comprising an indication of whether or not a migration of the corresponding chunk is in progress, the copy migration journal being separate from the plurality of chunks of data that correspond to its copy migration entries;

maintaining a write migration journal comprising a plurality of write migration entries, each write migration entry of the write migration journal corresponding to a different chunk of the plurality of chunks and comprising an indication of whether or not a write operation associated with the corresponding chunk is in progress responsive to a reboot of a host device during the migration of the plurality of chunks of data from the source logical storage volume of the at least one storage system to the target logical storage volume of the at least one storage system:

determining, by the host device, based at least in part on a given copy migration entry of the copy migration journal, the given copy migration entry corresponding to a first chunk of the plurality of chunks, that the migration of the first chunk from the source logical storage volume to the target logical storage volume was in progress prior to the reboot; and determining, by the host device, based at least in part on a given write migration entry of the write migration journal, the given write migration entry corresponding to a second chunk of the plurality of chunks, that a write operation associated with the second chunk was in progress prior to the reboot;

determining, by the host device, based at least in part on the determination that the write operation associated with the second chunk was in progress prior to the reboot, to temporarily suspend the migration of the plurality of chunks from the source logical storage volume to the target logical storage volume and to perform the write operation associated with the second chunk while the migration is suspended;

determining, by the host device, based at least in part on a completion of the write operation associated with the second chunk, to update the given write migration entry to indicate that a write operation associated with the second chunk is not in progress; and resuming, by the host device, the migration of the plurality of chunks from the first chunk based at least in part on the update of the given write migration entry to indicate that a write operation associated with the second chunk is not in progress and based at least in part on the determination that the migration of the first chunk was in progress prior to the reboot;

wherein the host device comprises a processor coupled to a memory.

9. The method of claim 8 wherein the reboot of the host device is performed in response to a crash of the host device and wherein the given copy migration entry of the copy migration journal corresponding to the first chunk indicates that the migration of the first chunk from the source logical storage volume to the target logical storage volume was in progress when the crash of the host device occurred.

10. The method of claim 8 further comprising:
responsive to completion of the migration of the first chunk from the source logical storage volume to the target logical storage volume, selecting a next chunk of the plurality of chunks to be migrated from the source logical storage volume to the target logical storage volume;

setting a copy migration entry in the copy migration journal corresponding to the next chunk to indicate that the migration of the next chunk is in progress;

clearing the given copy migration entry in the copy migration journal corresponding to the first chunk to indicate that the migration of the first chunk is no longer in progress; and initiating migration of the next chunk from the source logical storage volume to the target logical storage volume.

11. The method of claim 8 further comprising:
obtaining a second write operation targeting the source logical storage volume during the migration of the plurality of chunks of data from the source logical storage volume to the target logical storage volume;

identifying a chunk of the plurality of chunks that contains data targeted by the second write operation;

determining whether or not a write migration entry in the write migration journal that corresponds to the identified chunk indicates that a write operation associated with the identified chunk is in progress;

responsive to the write migration entry in the write migration journal that corresponds to the identified chunk indicating that a write operation associated with the identified chunk is not in progress, setting the write migration entry in the write migration journal that corresponds to the identified chunk to indicate that a write operation associated with the identified chunk is in progress;

responsive to the write migration entry in the write migration journal that corresponds to the identified chunk indicating that a write operation associated with the identified chunk is in progress, processing the second write operation for both the source logical storage volume and the target logical storage volume; and clearing the write migration entry in the write migration journal that corresponds to the identified chunk to indicate that a write operation associated with the identified chunk is not in progress based at least in part on a completion of the processing of the second write operation for both the source logical storage volume and the target logical storage volume.

12. The method of claim 11 wherein the copy migration journal comprises the write migration journal and wherein the second write operation associated with the identified chunk is at least one of a write operation targeting data of the identified chunk and a copy operation of the identified chunk from the source logical storage volume to the target logical storage volume.

13. The method of claim 8 wherein the write migration journal and the copy migration journal are different journals.

14. The method of claim 8 wherein the copy migration journal is a bitmap, each bit of the bitmap corresponding to one of the plurality of chunks.

15. A computer program product comprising a non-transitory processor-readable storage medium having stored therein program code of one or more software programs, wherein the program code, when executed by a host device comprising a processor coupled to a memory, causes the host device:

to communicate over a network with at least one storage system comprising a source logical storage volume and a target logical storage volume;

to migrate a plurality of chunks of data from the source logical storage volume to the target logical storage volume;

to maintain a copy migration journal comprising a plurality of copy migration entries, each copy migration entry of the copy migration journal corresponding to a different chunk of the plurality of chunks and comprising an indication of whether or not a migration of the corresponding chunk is in progress, the copy migration journal being separate from the plurality of chunks of data that correspond to its copy migration entries;

to maintain a write migration journal comprising a plurality of write migration entries, each write migration entry of the write migration journal corresponding to a different chunk of the plurality of chunks and comprising an indication of whether or not a write operation associated with the corresponding chunk is in progress;

responsive to a reboot of the host device during the migration of a plurality of chunks of data from the source logical storage volume to the target logical storage volume:

to determine, based at least in part on a given copy migration entry of the copy migration journal, the given copy migration entry corresponding to a first chunk of the plurality of chunks, that the migration of the first chunk from the source logical storage volume to the target logical storage volume was in progress prior to the reboot;

to determine, based at least in part on a given write migration entry of the write migration journal, the given write migration entry corresponding to a second chunk of the plurality of chunks, that a write operation associated with the second chunk was in progress prior to the reboot;

based at least in part on the determination that the write operation associated with the second chunk was in progress prior to the reboot, to temporarily suspend the migration of the plurality of chunks from the source logical storage volume to the target logical storage volume and to perform the write operation associated with the second chunk while the migration is suspended;

based at least in part on a completion of the write operation associated with the second chunk, to update the given write migration entry to indicate that a write operation associated with the second chunk is not in progress; and to resume the migration of the plurality of chunks from the first chunk based at least in part on the update of the given write migration entry to indicate that a write operation associated with the second chunk is not in progress and based at least in part on the determination that the migration of the first chunk was in progress prior to the reboot.

16. The computer program product of claim 15 wherein the program code further causes the host device:

responsive to completion of the migration of the first from the source logical storage volume to the target logical storage volume, to select a next chunk of the plurality of chunks to be migrated from the source logical storage volume to the target logical storage volume;

to set a copy migration entry in the copy migration journal corresponding to the next chunk to indicate that the migration of the next chunk is in progress;

to clear the given copy migration entry in the copy migration journal corresponding to the first chunk to indicate that the migration of the first chunk is no longer in progress; and to initiate migration of the next chunk from the source logical storage volume to the target logical storage volume.

17. The computer program product of claim 15 wherein the program code further causes the host device:

to obtain a second write operation targeting the source logical storage volume during the migration of the plurality of chunks of data from the source logical storage volume to the target logical storage volume;

to identify a chunk of the plurality of chunks that contains data targeted by the second write operation;

to determine whether or not a write migration entry in the write migration journal that corresponds to the identified chunk indicates that a write operation associated with the identified chunk is in progress;

responsive to the write migration entry in the write migration journal that corresponds to the identified chunk indicating that a write operation associated with the identified chunk is not in progress, to set the write migration entry in the write migration journal that corresponds to the identified chunk to indicate that a write operation associated with the identified chunk is in progress;

responsive to the write migration entry in the write migration journal that corresponds to the identified chunk indicating that a write operation associated with the identified chunk is in progress, to process the second write operation for both the source logical storage volume and the target logical storage volume; and to clear the write migration entry in the write migration journal that corresponds to the identified chunk to indicate that a write operation associated with the identified chunk is not in progress based at least in part on a completion of the processing of the second write operation for both the source logical storage volume and the target logical storage volume.

18. The computer program product of claim 17 wherein the copy migration journal comprises the write migration journal and wherein the second write operation associated with the identified chunk is at least one of a write operation targeting data of the identified chunk and a copy operation of the identified chunk from the source logical storage volume to the target logical storage volume.

19. The computer program product of claim 15 wherein the reboot of the host device is performed in response to a crash of the host device and wherein the given copy migration entry of the copy migration journal corresponding to the first chunk indicates that the migration of the first chunk from the source logical storage volume to the target logical storage volume was in progress when the crash of the host device occurred.

20. The computer program product of claim 15 wherein the write migration journal and the copy migration journal are different journals.

* * * * *